(12) United States Patent
Baek et al.

(10) Patent No.: US 12,542,285 B2
(45) Date of Patent: Feb. 3, 2026

(54) AIR SUPPLY APPARATUS FOR FUEL CELL

(71) Applicant: TERRALIX CO., LTD., Buan-gun (KR)

(72) Inventors: Sang Cheol Baek, Jeonju-si (KR); Dae Sung Kim, Buan-gun (KR)

(73) Assignee: TERRALIX CO., LTD., Buan-gun (KR)

( * ) Notice: Subject to any disclaimer, the term of this patent is extended or adjusted under 35 U.S.C. 154(b) by 622 days.

(21) Appl. No.: 17/924,973

(22) PCT Filed: Jul. 18, 2022

(86) PCT No.: PCT/KR2022/010458
§ 371 (c)(1),
(2) Date: Nov. 11, 2022

(87) PCT Pub. No.: WO2023/090572
PCT Pub. Date: May 25, 2023

(65) Prior Publication Data
US 2024/0222659 A1    Jul. 4, 2024

(30) Foreign Application Priority Data
Nov. 19, 2021    (KR) .................. 10-2021-0160233

(51) Int. Cl.
*H01M 8/04014*    (2016.01)
*H01M 8/10*    (2016.01)

(52) U.S. Cl.
CPC .............. *H01M 8/04014* (2013.01); *H01M 2008/1095* (2013.01)

(58) Field of Classification Search
CPC ......... H01M 8/04014; H01M 8/04007; H01M 8/04074; H01M 8/04358; H01M 8/04365; H01M 8/04373; H01M 2008/1095
See application file for complete search history.

(56) References Cited

U.S. PATENT DOCUMENTS

| | | | | |
|---|---|---|---|---|
| 7,008,710 B2* | 3/2006 | Yang | ................. | H01M 8/04126 429/432 |
| 9,620,794 B2* | 4/2017 | Morita | ................ | H01M 8/0618 |
| 2015/0188164 A1* | 7/2015 | Yu | ..................... | H01M 8/04089 429/458 |

FOREIGN PATENT DOCUMENTS

| | | | | |
|---|---|---|---|---|
| KR | 20110055153 A | * | 5/2011 | ............. H01M 8/04 |
| KR | 20140135383 A | * | 11/2014 | ............. F04D 17/08 |
| KR | 10-2017-0077897 A | | 7/2017 | |

OTHER PUBLICATIONS abstract of KR 20110055153) Ham Mi Sook, Fuel Cell System, May 25, 2011.*

(Continued)

*Primary Examiner* — Raymond Alejandro
(74) *Attorney, Agent, or Firm* — Goldilocks Zone IP LAW

(57) ABSTRACT

A task performance method for a system configured to perform a task on a delivery object using a plurality of robots assisting a worker, in which the task includes information on a location where one or more delivery objects are stored and the system includes a server and the plurality of robots, wherein the task performance method includes assigning, by the server, at least one task of a plurality of tasks stored in advance to a first robot among the plurality of robots, determining, by the server, a path for arranging the first robot to a first location in which at least one delivery object related to the task assigned to the first robot is stored, guiding the first robot to the first location according to the determined path, and guiding the first robot arranged in the first position to a second position.

3 Claims, 4 Drawing Sheets

(56) References Cited

OTHER PUBLICATIONS abstract of KR 20140135383) Lee et al, Air Blower for Fuel Cell Car, Nov. 26, 2014.*

* cited by examiner

[FIG. 1]
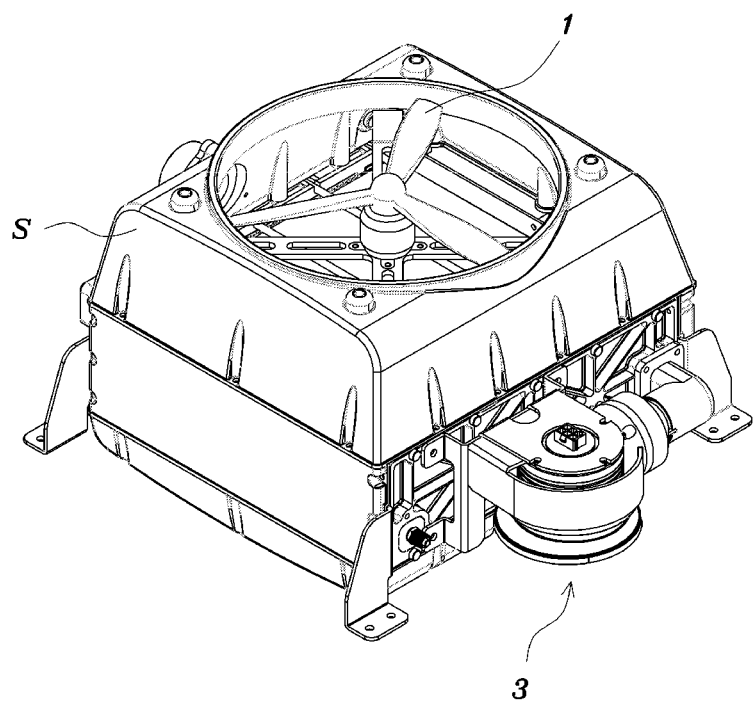

[FIG. 2]
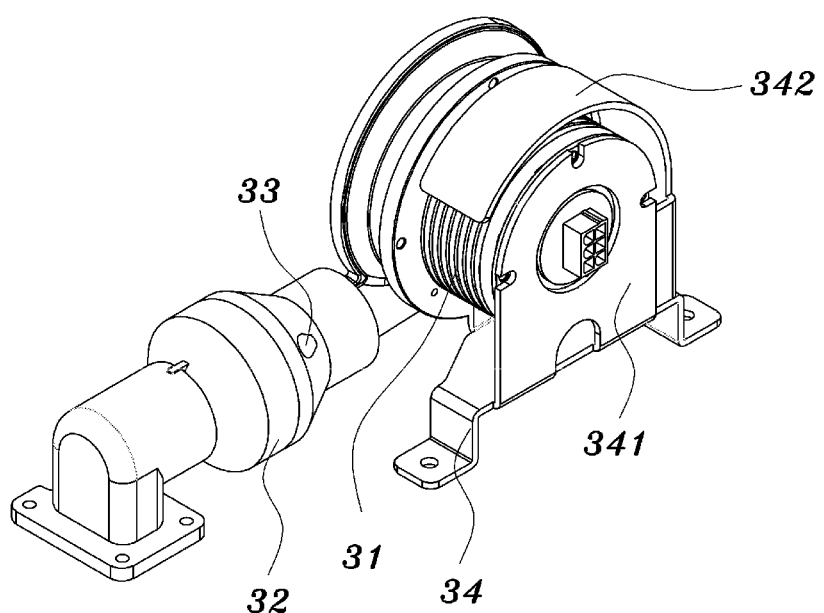

[FIG. 3]
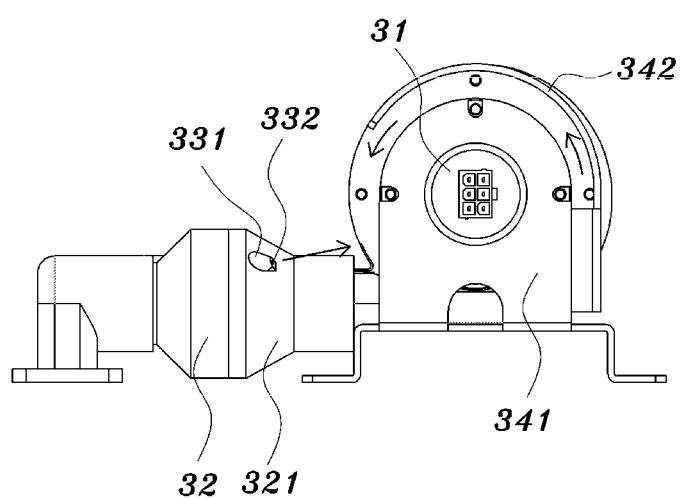

[FIG. 4]
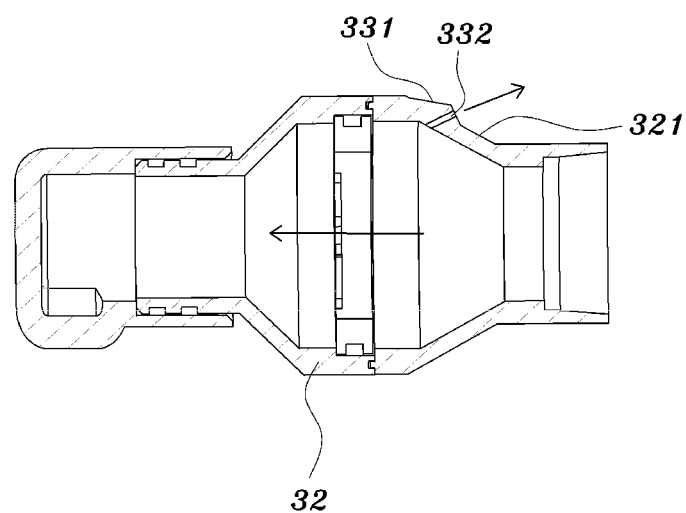

AIR SUPPLY APPARATUS FOR FUEL CELL

CROSS-REFERENCE TO RELATED APPLICATIONS

This application claims the benefit under 35 U.S.C. section 371, of PCT International Application No. PCT/KR2022/010458, filed on Jul. 18, 2022, which claims priority to Korean Patent Application No. 10-2021-0160233, filed on Nov. 19, 2021, in the Korean Intellectual Property Office, both of which are hereby incorporated by reference in their entireties.

TECHNICAL FIELD

The present disclosure relates generally to an air supply apparatus for a fuel cell. More particularly, the present disclosure relates to an air supply apparatus for a fuel cell, in which a blower fan for supplying air for cooling a stack and a blower for supplying air for reaction in the fuel cell are separately provided, thereby preventing overheating of the blower through efficient operation of the blower and preventing damage to the fuel cell caused by oxygen, foreign substances, etc. being supplied to a cathode during storage of the fuel cell; and a part of air supplied through an air generating part of the blower is sprayed toward the outside of the air generating part, thereby preventing overheating of the air generating part and lowering the temperature of air supplied to the cathode.

BACKGROUND ART

A fuel cell is a type of power generator that converts chemical energy of fuel into electric energy through an electrochemical reaction. Fuel cells have a wide range of applications, including serving as industrial power generators, serving as household power generators, powering vehicles, and powering small electronic devices such as portable devices.

There are several types of fuel cells, but polymer electrolyte membrane fuel cells (PEMFCs) with high power density as disclosed in the following patent document are mainly used. In a PEMFC, a membrane electrode assembly (MEA) is located at the innermost portion of the cell. The MEA includes a polymer electrolyte membrane (PEM) for allowing transport of positively charged hydrogen ions (protons) therethrough, and catalyst layers, i.e., a cathode and an anode, applied on opposite surfaces of the PEM to cause hydrogen and oxygen to react. Hydrogen is supplied to the anode while air is supplied to the cathode, and electricity is generated through the reaction between oxygen contained in the air and hydrogen.

In addition, since a lot of heat is generated by the reaction in the fuel cell, it is necessary to supply a fluid for cooling.

Fuel cells may be divided into a water-cooling type and an air-cooling type depending on cooling methods. In order to simplify the configuration of a device and to reduce the size and weight of the device, the air-cooling type which is cooled by air is mainly used. In a typical air-cooling type fuel cell, as disclosed in the following patent document, air for reaction and air for cooling are supplied to the fuel cell together through a blower module or the like.

In this case, the cathode to which air is supplied is always open to the outside, so it is likely to be corroded and is vulnerable to the external environment.

In an attempt to solve such a problem, a system for supplying air through a pump, a blower, etc. has been developed and used. However, the pump increases an apparatus size and consumes excessively high power. Also, the blower is overheated as it rotates fast, causing the temperature of air to become excessively high and the relative humidity of air to become excessively low and thereby deteriorating the performance of the fuel cell and causing damage to the cathode.

(Patent Document) Korean Patent Application Publication No. 10-2017-0077897 (published on Jul. 7, 2017) "Fuel cell stack having open flow passage"

DISCLOSURE

Technical Problem

Accordingly, the present disclosure has been made keeping in mind the above problems occurring in the related art.

An objective of the present disclosure is to provide an air supply apparatus for a fuel cell, in which a blower fan for supplying air for cooling a stack and a blower for supplying air for reaction in the fuel cell are separately provided, thereby preventing overheating of the blower through efficient operation of the blower and preventing damage to the fuel cell caused by oxygen, foreign substances, etc. being supplied to a cathode during storage of the fuel cell.

Another objective of the present disclosure is to provide an air supply apparatus for a fuel cell, in which a part of air supplied through an air generating part of a blower is sprayed toward the outside of the air generating part, thereby preventing overheating of the air generating part and lowering the temperature of air supplied to a cathode.

Still another objective of the present disclosure is to provide an air supply apparatus for a fuel cell, in which air is sprayed toward an air generating part through a spray hole of a predetermined length formed in a protruding end, thereby enabling accurate and efficient air spraying and effective cooling for the air generating part.

Yet another objective of the present disclosure is to provide an air supply apparatus for a fuel cell, in which air is sprayed through a spray hole formed on an inclined surface of an air supply duct, thereby enabling both supply of compressed air for reaction and spraying of cooling air toward an air generating part to be effectively performed.

Still yet another objective of the present disclosure is to provide an air supply apparatus for a fuel cell, in which air sprayed through an air spray part flows along a guide member surrounding an air generating part, thereby enabling effective cooling for the air generating part.

Still yet another objective of the present disclosure is to provide an air supply apparatus for a fuel cell, in which a fixing member is formed at an end of an air generating part, and a guide member is integrally coupled to the fixing member, so that air sprayed through an air spray part can efficiently flow around the air generating part.

Technical Solution

The present disclosure is implemented by embodiments having the following configuration in order to achieve the above objectives.

According to one embodiment of the present disclosure, there is provided an air supply apparatus for a fuel cell the air supply apparatus including: a blowing fan configured to supply air for cooling a fuel cell stack; and a blower mounted on a side of the stack and configured to supply air for reaction in the fuel cell.

According to another embodiment of the present disclosure, in the air supply apparatus according to the present disclosure, the blower may include an air generating part configured to generate compressed air, an air supply duct configured to supply air generated by the air generating part into the stack, and a fixing frame fixing the air generating part to the side of the stack.

According to still another embodiment of the present disclosure, in the air supply apparatus according to the present disclosure, the blower may further include an air spray part formed on the air supply duct and configured to spray compressed air toward the air generating part.

According to yet another embodiment of the present disclosure, in the air supply apparatus according to the present disclosure, the air supply part may include a protruding end formed to protrude from the air supply duct, and a spray hole formed through the protruding end to form a passage that allows air to be sprayed toward the air generating part.

According to still yet another embodiment of the present disclosure, in the air supply apparatus according to the present disclosure, the air supply duct may include an inclined surface inclined so that a diameter thereof increases in a direction in which compressed air is supplied to the stack, and the air spray part is formed on the inclined surface.

According to still yet another embodiment of the present disclosure, in the air supply apparatus according to the present disclosure, the fixing frame may include a guide member formed to surround the air generating part to form a passage that allows air sprayed through the air generating part to flow around the air generating part.

According to still yet another embodiment of the present disclosure, in the air supply apparatus according to the present disclosure, the fixing frame may further include a fixing member fixed to an end of the air generating part to fix the air generating part to the stack, and integrally coupled to the guide member.

Advantageous Effects

The present disclosure can achieve the following effects by the above embodiments, and the configuration, combination, and use relationship described below.

A blower fan for supplying air for cooling a stack and a blower for supplying air for reaction in the fuel cell are separately provided, thereby preventing overheating of the blower through efficient operation of the blower and preventing damage to the fuel cell caused by oxygen, foreign substances, etc. being supplied to a cathode during storage of the fuel cell.

A part of air supplied through an air generating part of the blower is sprayed toward the outside of the air generating part, thereby preventing overheating of the air generating part and lowering the temperature of air supplied to the cathode.

Air is sprayed toward the air generating part through a spray hole of a predetermined length formed in a protruding end, thereby enabling accurate and efficient air spraying and effective cooling for the air generating part.

Air is sprayed through the spray hole formed on an inclined surface of an air supply duct, thereby enabling both supply of compressed air for reaction and spraying of cooling air toward an air generating part to be effectively performed.

Air sprayed through the air spray part flows along a guide member surrounding the air generating part, thereby enabling effective cooling for the air generating part.

A fixing member is formed at an end of the air generating part, and the guide member is integrally coupled to the fixing member, so that air sprayed through the air spray part can efficiently flow around the air generating part.

DESCRIPTION OF DRAWINGS

FIG. 1 is a perspective view illustrating a fuel cell stack in which an air supply apparatus for a fuel cell according to an embodiment of the present disclosure is installed.

FIG. 2 is a perspective view illustrating a blower of the air supply apparatus for the fuel cell according to the embodiment of the present disclosure.

FIG. 3 is a front view of FIG. 2.

FIG. 4 is a sectional view illustrating an example in which an air spray part is formed in an air supply duct.

| * Description of the Reference Numerals in the Drawings | |
|---|---|
| 1: blowing fan | 3: blower |
| 31: air generating part | 32: air supply duct |
| 321: inclined surface | 33: air spray part |
| 331: protruding end | 332: spray hole |
| 34: fixing frame | 341: fixing member |
| 342: guide member | S: stack |

BEST MODE

Hereinafter, exemplary embodiments of an air supply apparatus for a fuel cell according to the present disclosure will be described in detail with reference to the accompanying drawings. In the following description of the present disclosure, detailed descriptions of known functions and components incorporated herein will be omitted when it may make the subject matter of the present disclosure unclear. Unless the context clearly indicates otherwise, it will be further understood that the terms "comprise", "include", and/or "have", when used herein, specify the presence of stated features, integers, steps, operations, elements, and/or components, but do not preclude the presence or addition of one or more other features, integers, steps, operations, elements, components, and/or groups thereof.

An air supply apparatus for a fuel cell according to an embodiment of the present disclosure will be described with reference to FIGS. 1 to 4. The air supply apparatus for the fuel cell includes a blowing fan 1 for supplying air for cooling a fuel cell stack S, and a blower 3 mounted at a side of the stack S to supply air for reaction in a fuel cell.

In a typical fuel cell, a plurality of unit cells are stacked to form the stack S, and air for cooling and air for reaction need to be supplied to the unit cells in the stack S. Therefore, as described in the background art, the stack S is formed in a fully open type so that air for cooling and air for reaction are supplied together by one blower module. However, in this case, a cathode is always in an open state and thus is vulnerable to corrosion and external environment. This results in reduced durability, rapid performance degradation, and shortened lifespan of the fuel cell.

In an attempt to solve such a problem, a technology has been developed to provide compressed air for reaction and cooling through a pump, a blower, etc. However, the pump increases an apparatus size and consumes excessively high power. Also, when the blower supplies air for cooling and air for reaction together, it is necessary to increase an operation degree of the blower to secure the flow rate. This causes the blower to be overheated, thereby leading to increasing the temperature of air. As a result, the cooling effect is reduced, and when air with high temperature and low relative humidity is supplied to the cathode, the performance of the fuel cell is degraded and the fuel cell is damaged.

Accordingly, in the present disclosure, air for cooling and air for reaction are supplied by the blowing fan 1 and the blower 3, respectively, so that a cathode is maintained in a closed state. At the same time, increasing the operation degree of the blower 3 is not necessary because the blower 3 only supplies air for reaction, thereby preventing overheating of the blower 3 and lowering the temperature of the supplied air. However, since the blower 3 inevitably generates high-temperature heat when operated, the present disclosure is designed to have a unique structure for cooling the blower 3, in which the blower 3 itself can be cooled without requiring a separate cooling device, thereby simplifying the configuration of the apparatus and minimizing the area occupied by the fuel cell.

The blowing fan 1 is a configuration for supplying air for cooling the fuel cell to the stack S. As illustrated in FIG. 1, the blowing fan 1 is provided at a side of the stack S to supply outside air into the stack S by its rotation.

The blower 3 is a configuration for supplying air for reaction to the stack S, more precisely, to supply air to the cathode of the fuel cell. The blower 3 compresses air by a rotational force of a screw and supplies the compressed air to the stack S. The air is compressed to a sufficiently high pressure to secure high performance of the fuel cell. The blower 3 is mounted on a side of the stack S to supply the compressed air into the stack S, In particular, a part of the compressed air supplied into the stack S is sprayed toward the outside of the blower 3 to lower the temperature of the blower 3. Thus, the blower 3 is prevented from overheating without requiring a separate device for cooling, lowers the temperature of air supplied to the cathode to lower the relative humidity, and prevents performance degradation and damage of the fuel cell caused by supply of excessively dry air. To this end, the blower 3 includes an air generating part 31, an air supply duct 32, an air spray part 33, and a fixing frame 34.

The air generating part 31 is a configuration for generating compressed air, and compresses air by rotation of a screw or the like so as to be supplied into the stack S. The air generating part 31 is supported by the fixing frame 34 to be fixed to the side of the stack S. Air compressed by the air generating part 31 is supplied to the cathode inside the stack S through the air supply duct 32. More precisely, air supplied by the air generating part 31 is supplied to the cathode of each of the unit cells in the stack S through a manifold in the stack S. In particular, air from the air generating part 31 is sprayed by the air spray part 33, so that the air generating part 31 is cooled and prevented from overheating and excessively high temperature of air supplied to the stack S is lowered.

The air supply duct 32 is a configuration for connecting the air generating part 31 and the inside of the stack S, and supplies air compressed by the air generating part 31 to the cathode inside the stack S. In particular, the air spray part 33 is formed on the air supply duct 32 toward the air generating part 31 to spray compressed air toward the air generating part 31. In addition, the air supply duct 32 includes an inclined surface 321 inclined in the direction toward the inside of the stack S so that the diameter thereof increases toward the inside of the air supply duct 32. The air supply part 33 is formed on the inclined surface 32. With this configuration in which the air supply part 33 is formed on the inclined surface 32, the air supply duct 32 sprays compressed air toward the air generating part 31 at a strong pressure while maintaining the flow of compressed air supplied to the stack S as much as possible.

The air spray part 33 is a configuration formed on the air supply duct 32 to spray compressed air toward the air generating part 31, and is formed on the inclined surface 321. As an example, as illustrated in FIG. 3, the air spray part 33 sprays air toward a lower side of the air generating part 31, and the air sprayed to the lower side of the air generating part 31 flows around the air generating part 31 along a guide member 342 which will be described later. The air spray part 33 includes a protruding end 331 and a spray hole 332 for effective spraying of air toward the air generating part 31.

The protruding end 331 is a configuration protruding from the inclined surface 321, and is formed to have a predetermined gap with respect to the air generating part 31. Therefore, the spray hole 332 is formed through the protruding end 331 while having a predetermined length sufficient to allow air passing through the spray hole 332 to be accurately sprayed toward the air generating part 31 at a sufficient pressure and speed.

The spray hole 332 is a configuration formed through the protruding end 331 to allow air to be sprayed toward the air generating part 31, and forms a space for communicating the inside and the outside of the air supply duct 32. The spray hole 332 is formed in the direction toward the lower side of the air generating part 31, so that air passing through the spray hole 332 accurately flows to the lower side of the air generating part 31. In addition, since the spray hole 332 is formed to have a predetermined length in the protruding end 331, air is sprayed toward the air generating part 31 at a sufficient pressure and speed without interfering with the flow of compressed air, thereby effectively cooling the air generating part 31.

The fixing frame 34 is a configuration for fixing the air generating part 31 to the side of the stack S, and flows air sprayed through the air spray part 33 around the air generating part 31 to effectively cool the air generating part 31. To this end, the fixing frame 34 includes a fixing member 341 and the guide member 342.

The fixing member 341 is coupled to an end of the air generating part 31 to be fixed to the side of the stack S, and has a rear end integrally coupled to the guide member 342. Therefore, the fixing member 341 blocks a side of the air generating part 31, and the guide member 342 integrally coupled to the rear end of the fixing member 341 blocks a rear side of the air generating part 31, so that air sprayed through the air spray part 33 flows around the air generating part 31 along the guide member 342. Here, the rear side means the opposite side of the air spray part 33. Air sprayed by the air spray part 33 flows along the guide member 342 while colliding with the guide member 342 at the rear side of the air generating part 31.

The guide member 342 is a configuration surrounding the air generating part 31, and is formed to be rounded from the rear side of the air generating part 31 to a front side thereof to guide the flow of air sprayed by the air spray part 33. In addition, since the guide member 342 is integrally coupled to the fixing member 341 at the rear side of the air generating part 31, air sprayed by the air spray part 33 is prevented from escaping, and is moved along the guide member 342 while colliding with the guide member 342 and discharged to the front side of the air generating part 31. Thus, air sprayed by the air spray part 33 flows around the air generating part 31 from the rear side of the air generating part 31 to the front side of the air generating part 31, so that the air generating part 31 is effectively cooled by air sprayed by the air spray part 33.

Although applicant has described applicant's preferred embodiments of this disclosure, it should be understood that these embodiments are not construed as limited to the disclosure and should be understood to include all changes, equivalents, and alternatives within the idea and the technical scope of the disclosure.

The invention claimed is:

1. An air supply apparatus for a fuel cell, the air supply apparatus comprising:
    a blowing fan configured to supply air for cooling a fuel cell stack; and
    a blower mounted on a side of the fuel cell stack and configured to supply air for reaction in the fuel cell,
    wherein the blower comprises an air generating part configured to generate compressed air, an air supply duct configured to supply air generated by the air generating part into the fuel cell stack, and a fixing frame fixing the air generating part to the side of the fuel cell stack,
    wherein the blower further comprises an air spray part formed on the air supply duct and configured to spray compressed air toward the air generating part,
    wherein the air supply part comprises a protruding end formed to protrude from the air supply duct, and a spray hole formed through the protruding end to form a passage that allows air to be sprayed toward the air generating part,
    wherein the air supply duct comprises an inclined surface inclined so that a diameter thereof increases in a direction in which compressed air is supplied to the fuel cell stack, and the air spray part is formed on the inclined surface.

2. The air supply apparatus of claim 1, wherein the fixing frame comprises a guide member formed to surround the air generating part to form a passage that allows air sprayed through the air generating part to flow around the air generating part.

3. The air supply apparatus of claim 2, wherein the fixing frame further comprises a fixing member fixed to an end of the air generating part to fix the air generating part to the fuel cell stack, and integrally coupled to the guide member.

* * * * *